United States Patent

[11] 3,604,954

| [72] | Inventor | Joe Turner May<br>Wilmington, Del. |
|---|---|---|
| [21] | Appl. No. | 678,318 |
| [22] | Filed | Oct. 26, 1967 |
| [45] | Patented | Sept. 14, 1971 |
| [73] | Assignee | E. I. du Pont de Nemours and Company<br>Wilmington, Del. |

[54] TRANSISTORIZED KNOCK SIGNAL GENERATOR
1 Claim, 2 Drawing Figs.

[52] U.S. Cl............................................................ 307/264,
307/235, 328/213, 330/29, 330/32, 330/87,
331/113
[51] Int. Cl............................................................ H03k 5/02
[50] Field of Search............................................. 307/264,
274, 283, 301, 247; 330/29, 32, 87; 331/111, 113;
328/213

[56] References Cited
UNITED STATES PATENTS

| 2,200,055 | 5/1940 | Burnett..................... | 330/87 |
|---|---|---|---|
| 2,663,765 | 12/1953 | De Boisblanc............ | 330/87 X |
| 2,963,656 | 12/1960 | Parris........................ | 330/32 X |
| 2,997,665 | 8/1961 | Sylvan...................... | 331/113 |
| 3,142,019 | 7/1964 | Favin........................ | 330/29 X |
| 3,205,458 | 9/1965 | Geery........................ | 330/29 X |
| 3,255,418 | 6/1966 | Dufendach et al........ | 330/32 X |
| 3,260,949 | 7/1966 | Voorhoeve................ | 330/32 X |
| 3,299,287 | 1/1967 | Staeudle................... | 330/32 X |
| 2,638,273 | 5/1953 | Jensen et al.............. | 328/213 X |
| 2,659,775 | 11/1953 | Coulter..................... | 328/213 X |
| 2,662,981 | 12/1953 | Segerstrom............... | 328/213 X |
| 3,324,390 | 6/1967 | O'Leary et al............ | 328/151 X |
| 3,405,236 | 10/1918 | Neiswinter et al........ | 307/235 X |

*Primary Examiner*—Donald D. Forrer
*Assistant Examiner*—R. C. Woodbridge
*Attorney*—Francis J. Crawley ABSTRACT: Improved electronic wave signal generator having one or more variable attenuating means for converting fixed voltage square waves to variable voltage magnitude square waves especially useful in checking and calibrating detonation meters.

PATENTED SEP 14 1971 3,604,954

3,604,954

TRANSISTORIZED KNOCK SIGNAL GENERATOR

This invention relates to improved wave signal generators. More specifically it relates to improved signal generators which are especially useful in testing of the electrical and electronic equipment associated with the operation of a knock test engine which is being used to determine the knock or detonation qualities of a fuel such as gasoline.

BACKGROUND

Methods which gasoline refiners use to add tetraethyllead to gasoline stocks have advanced to the point where continuous pipeline blending at rapid rates is feasible. In order to do this economically, means to measure and control the blending amounts are required. A device, known as an octane comparator, has been developed for ascertaining, in conjunction with knock testing engines etc., the octant rating of a particular blend as compared to that of a prototype fuel. The results are read on a chart which is part of an instrument known as a detonation meter. Continued operation of the detonation meter over a period of time will result in some components changing in certain characteristics. To aid in the calibration of the detonation meter and check on the correct operation of its components, it is therefore necessary to provide means for supplying a known characteristic signal into the equipment. Such a simulated signal is supplied by the improved wave signal generator of this invention.

Various attempts have been made in the past to provide signal generators for detonation measuring equipment. Some signal generators utilize photoelectric cells, vacuum tubes, multivibrators or other devices to produce simulated signals, but are expensive, require time-consuming maintenance and lack the variability provided by the instant invention. While general purpose wave generators have been developed employing less expensive and time-consuming electronic components, as described in T. P. Sylvan's U.S. Pat. No. 2,997,665, such electronic wave generators also fail to provide a variable signal capable of efficiently performing the required recalibration and checking of detonation meter components. It is therefore a purpose of the instant invention to provide an improved signal generator which will efficiently and inexpensively supply variable simulated detonation wave signals.

SUMMARY OF THE INVENTION

These and other objectives are accomplished by providing, in an electronic wave generator capable of producing a fixed voltage square wave across its output terminals (such as described by T. P. Sylvan in U.S. Pat. No. 2,997,665), variable attenuating means connected across the output terminals of the wave generator for picking off a square wave whose upper and lower voltage levels are a controlled variable percentage of the upper and lower voltage levels of the fixed square wave. For greater variability in operation, it is a preferred embodiment to also provide a second variable attenuating means for picking off a square wave whose upper and lower voltage levels are a controlled variable percentage of the square wave picked off by the first variable attenuating means. In another preferred embodiment, automatic switching means are provided for switching from the first variable square wave to the second variable square wave. Thus, a wide range of simulated wave signals may be generated for calibrating and checking of detonation meters, etc. These and other embodiments are explained in more detail by the discussion below.

BRIEF DESCRIPTION OF DRAWINGS

FIG. I is a block diagram of a variable wave signal generating device exemplary of the instant improved invention;

FIG. II is a schematic circuit diagram of the electrical elements of FIG. 1.

DETAILED DISCUSSION OF INVENTION

Figure 1:
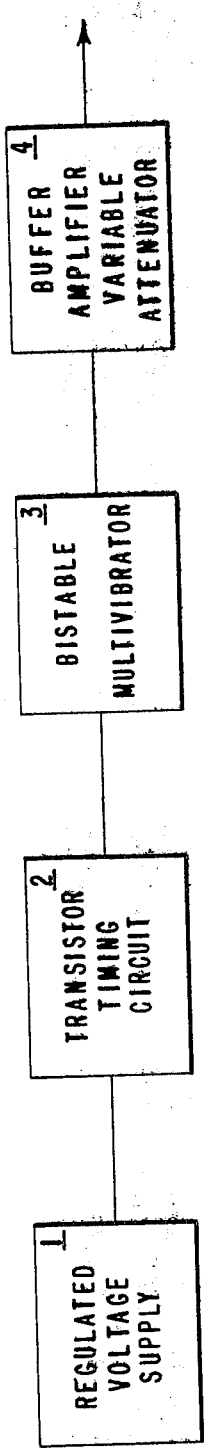

This invention relates to testing of the electric and electronic equipment associated with the operation of a knock test engine which is being used to determine the knock or detonation qualities of a fuel such as gasoline.

Despite much active research to develop chemical, electrical or other tests which might determine the quality (related to tendency to detonate) of a fuel such as gasoline, the best measure yet devised is to burn a quantity of the fuel in a single cylinder knock test engine. To replace the human ear as the instrument to decide whether a particular fuel causes knocking or does not, signal transmitters or transducers have been devised and installed in the combustion chamber of knock test engines. These signal transducers have the capability of receiving vibrations or pressure waves generated in the combustion chamber of the engine, converting the vibrations into electrical signals and transmitting the electrical pulses to an instrument capable of graphically portraying on chart paper, cathode ray tubes, or other devices just what the characteristics of the vibrations are. The transducers transmit signals representative of all the events which occur during a cycle of the engine that are capable of producing a vibration. Some of these are the firing of the spark, valves opening and closing, pressure rises due to the piston compressing the charge and the pressure waves generated by the firing of the charge. In the latter case, a smoothly burning mixture of air and fuel creates a different wave pattern than one which detonates or has a sharp peak pressure generation. Each of the various events creates its own characteristic electrical wave shape, frequency and duration and does so at a particular time during the course of the cycle. It is the function of the electrical and electronic circuitry external to the engine to receive the signals, filter out the undesirable ones and process the meaningful ones in order to indicate and/or record them in a fashion such that an operator will know the magnitude of knocking occurring in the engine.

In the operation of electronic equipment over a period of time, some components will change in certain characteristics such as resistance, capacitance etc. without giving any outward sign of such a change. In order to set up electronic equipment for a test run or in order to check it for correct operation during a run, it is desirable to have a means to feed a simulated knock signal into the equipment and thus be assured that readings being obtained are correct.

Various attempts have been made in the past to provide signal generators for detonation measuring equipment. Some signal generators utilize photoelectric cells, vacuum tubes, multivibrators, or other devices to produce the required voltages and frequencies that can be used to check the operation of the detonation meter. The more expensive and time consuming maintenance usually required for such circuits employing vacuum tubes and photoelectric cells is not required for the circuit of this invention since it uses transistors and it has another extremely important advantage. In the calibration or setting of a Waukesha Model 501A Detonation meter, for example, a somewhat lengthy and involved procedure is required. Simply stated, the knock test engine must be run using two reference test fuels having known octant ratings two octane numbers apart. The runs may require 30-minute time periods to allow for warming up, etc. The detonation meter readings and the "spread" for the two different octane readings are obtained by adjusting the instrument controls. "Spread" means the number of graduations on the knock intensity meter used to represent one octane number. For example a "spread" of 20 knock intensity units per octane number permits differences of 0.05 octane number to be readily visible. Once the controls are adjusted, fuels having approximately the same octane ratings may be checked in the engine. If fuels having different octane ratings (say more or less than three to five numbers away from the reference fuels) are to be tested, the calibration procedure must be repeated using reference fuels in the new bracket. If at any time instrument readings are obtained which are off the scale or otherwise give indications of malfunctions, a signal may be introduced from the signal generator which serves to advise that the electronic portions are functioning correctly. However, with the signal generators of the prior art type, it has been necessary to disturb the setting of the controls of the detonation meter for checking after which the meter has to be recalibrated with the reference fuels as previously described.

Figure 2:
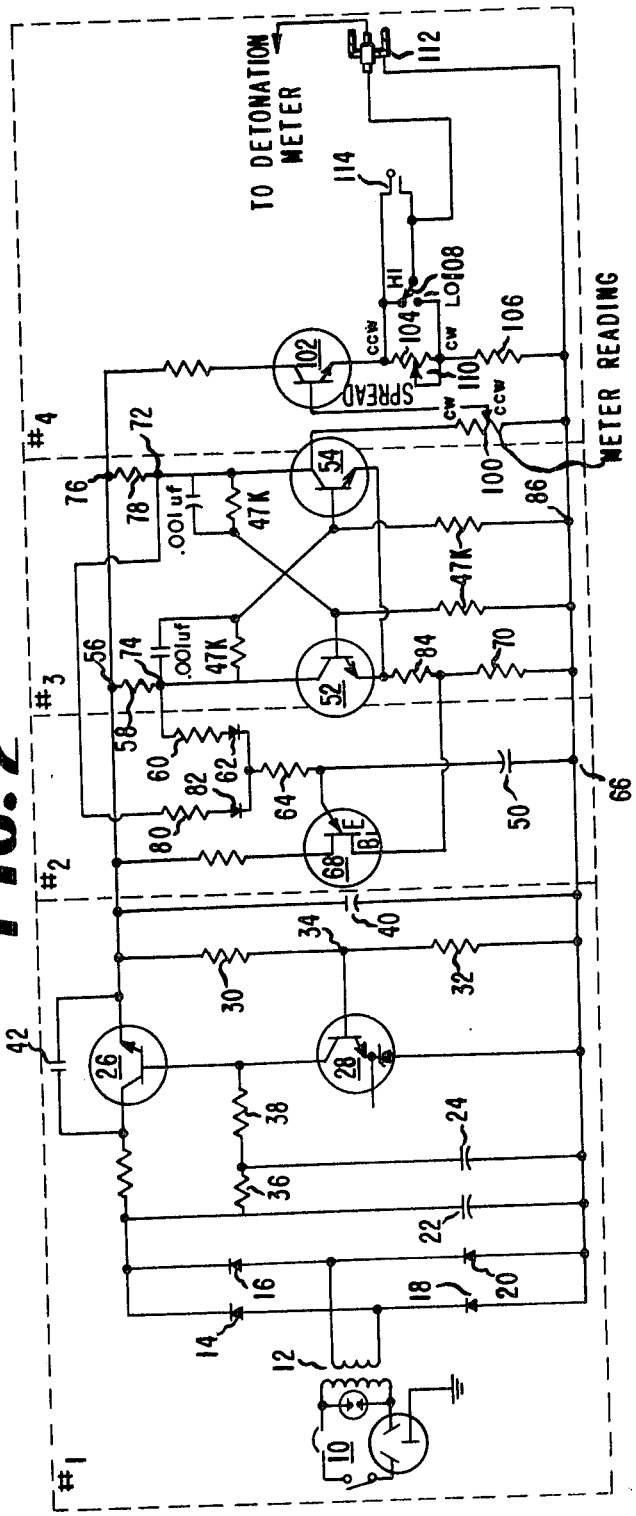

With the present invention as illustrated in FIG. 2, the pulses representing the simulated combustion chamber signal may be transmitted into the detonation meter without disturbing the settings of its adjustment controls. By means of variable resistors 100 and 104 and a "hi" to "lo" 108 control, the signal may be varied to give a reading on the meter and the meter is then checked to see if it is functioning correctly. With this simple check having been made, the testing of the fuels is continued without recalibration.

Operation of the Regulated Voltage Supply 1 occurs as follows: A 110-volt primary AC (alternating current) voltage source is connected at 10, the transformer 12 reduces the voltage to 24 volts and the four diodes 14, 16, 18 and 20 act as a full wave rectifier, converting the signal to pulsating direct current.

The 250 $\mu$f., 50 v. capacitor 22 and the 50 $\mu$f., 50 v. capacitor 24 provide a degree of filtering (ripple reduction) for the output of the full wave rectifier. Transistor 26 is a series regulating transistor which, in conjunction with the reference amplifier 28, varies its ability to pass current in such a manner that the voltage output at the emitter is essentially constant at 24 volts DC.

This occurs as follows: The 24 v. DC is imposed across the precision voltage divider formed by the metal film resistors 1.8 K 30 and 1.1 K 32. The voltage at junction 34 is normally 9.1 volts and is fed to the base of the reference amplifier 28. The reference amplifier 28 has a Zener diode in its emitter circuit such that in order for the base emitter junction to be forward biased (conducting) the voltage at the base lead must be at least 9.1 volts. If the voltage across the divider 30 and 32 drops below 24 volts, the voltage at junction 34 drops below 9.1 volts and 28 conducts less of the current supplied via the two 4.7 K resistors 36 and 38 through its collector lead. As a result, more of this current is supplied to the base of 26. The increased current into the base of 26 permits more current to pass through 26 and the voltage at its emitter increases. This increases the voltage across the resistors 30 and 32 until the voltage at junction 34 is brought back up to 9.1 volts. If the voltage drop across resistors 30 and 32 exceeds 24 volts, the voltage at 34 exceeds 9.1 volts. The increased current to the base of 28 causes it to conduct more of the current from 36 and 38, lowering the current at the base of 26, causing 26 to pass less current until the voltage at 34 is again 9.1 volts. The total effect of the circuitry described (Block No. 1) is to hold the voltage at the emitter of $Q_1$ essentially constant at 24 volts DC. The purpose of the 25 $\mu$f., 25 v. capacitor 40 across the emitter of 26 to ground is to reduce the output impedance of the 24 v. supply. The 0.01 $\mu$f. capacitor 42 coupled around 26 prevents high-frequency oscillation of the supply voltage and current.

The 24 v. DC pulsating signal next goes to Block 2 which constitutes a timing circuit which provides the trigger pulses to the bistable multivibrator of Block 3. Blocks 2 and 3 are substantially the same as described by T P. Sylvan in U.S. Pat. No 2,997,665.

Block 2 functions as follows: Assume that the 0.5 $\mu$f. capacitor 50 has no voltage on it, transistor 52 is in the nonconducting state, and transistor 54 is in the conducting state. Twenty-four volts potential is applied from conjunction 56 across the 3.9 K resistor 58, the 100 K resistor 60 the diode 62, the 2.7 K resistor 64 and the 0.5 $\mu$f. capacitor 50 to junction 66. This potential causes a current flow into the capacitor 50 causing the voltage across it to rise. The emitter E of transistor 68 is nonconductive until a voltage of about 12 volts is reached at the emitter of 68. When 12 volts are reached, the emitter E suddenly conducts and the 0.5 $\mu$f. capacitor 50 discharges through E and down through base electrode $B_1$ and the 33Ω (ohm) resistor 70 to ground. The result is a voltage spike across the 33Ω resistor 70 which tends to cut transistor 54 off, tending to raise potential at 72. A rise in potential at 72 tends to initiate conduction in 52 which causes potential at 74 to drop and this further cuts off 54. As soon as the capacitor 50 is discharged, emitter E of 68 again becomes nonconductive and the 0.5 $\mu$f. capacitor 50 again begins to charge. However, since 52 has become conductive and 54 nonconductive, the charging this time is through junction 76, the other 3.9 K resistor 78, the 100 K resistor 80 and diode 82 to junction 66. The charging-discharging cycle is repeated 10 times per second which results in a 5 cycle per second signal from the bistable multivibrator (Block 3). The frequency is dependent upon the values of the components in the charging path since these determine the rate of charging of the capacitor 50.

The bistable multivibrator (Block 3) is the actual signal generation circuit since the output signal is taken off the collector of transistor 54. At this point, the signal is a fixed voltage square wave having a lower voltage level of about 6 volts and an upper voltage level of about 24 volts at a frequency of approximately 5 cycles per second. The voltage levels are determined by the original potential level, resistances in the circuit and the conduction levels of the transistors. Transistors 52 and 54 are connected so that one is in the nonconducting state when the other is conducting. The signal results because the multivibrator changes state (switched to on-off configurations) due to the voltage increase at the emitter resistor 1 K 84 shared by 52 and 54. The voltage increase causes 52 or 54 to conduct less, this increases the potential at either 74 or 72 which causes the opposite transistor to begin conducting. This further affects the potential at 72 and 74 and in a very short time the states have alternated. For a further discussion of the timer circuit (Block 2) and bistable multivibrator (Block 3) see U.S. Pat. No. 2,997,665.

In order to convert the fixed voltage square wave signal transmitted across terminals 76 and 86 of the bistable multivibrator (Block 3) to a controllable variable voltage magnitude square wave useful in calibrating and checking detonation meter components, variable attenuating means and buffering means are provided in Block 4. More specifically, the output signal from 54 is imposed across the first attenuating means, a 10 K 10-turn potentiometer 100 labeled "meter reading." This potentiometer forms a variable attenuator. By moving the slider between the CW and CCW positions any upper or lower voltage magnitude signal level between 100 percent and 0 percent of the output signal from 54 may be obtained. This variable square wave signal may be used directly, but preferably the output signal picked off by the slider is fed to the base connection of transistor 102 which, in conjunction with the two resistors (5 K and 4.7 K 104 and 106 in its emitter circuit, form a buffer amplifier. Its voltage gain is +1 and its current gain is typically 30–90 so that for a relatively low powered signal input to the base, a relatively powerful signal is obtained. The output signal from the emitter of 102 is taken off the voltage divider formed by the 5 K "Spread" and 4.7 K resistors 104 and 106. If the switch 108 is in the "Hi" position, all of the signal delivered to the emitter is delivered to the 501A detonation meter. If the switch is in the "Lo" position a lower voltage magnitude signal is picked off because of the divider action of the 5 K and 4.7 K resistors 104 and 106, which act as the second variable attenuating means. If the slider 110 is in the CCW position, the signals obtained in the "Hi" and "Lo" switch positions are the same. If the slider is at the CW position, the voltage magnitude of the signal obtained in the "Lo" position is approximately 50 percent of that obtained in the "Hi" position because of divider action. Obviously all intermediate values between 50 percent and 100 percent may be obtained by suitable adjustment of the "Spread" slider 110. Note that the signal is 50 percent to 100 percent of the signal picked off the "Meter Reading" potentiometer 100 which is 0 percent to 100 percent of the signal generated by 54. The signal picked off by the switch arm is delivered through connector 112 to the detonation meter (not shown).

The phone jack 114 in parallel with the "Hi-Lo" switch 108 provides a remote switch to the "Hi" position by leaving the switch in the "Lo" position.

Thus the chief differences between fixed-voltage wave generators such as taught by U.S. Pat. No. 2,997,665 and the improved generator of the instant invention come about because of the variability added to the signal through the variable attenuating means, buffering means and switching means of Block 4. Before explaining further about the advantages accruing from this increased variability, a few comments about the calibration of the detonation meter are in order. The detonation meter indicates the intensity of the knocking or detonation occurring in the combustion chamber of the single cylinder engine. The knock intensity scale is graduated from 0 to 100. By means of adjusting potentiometers in the detonation meter, the needle indicating knock intensity may be made to hover about the 40 mark on the scale when the engine is operating on a reference fuel A having a higher octane rating than reference fuel B. Then when the engine is operating on reference fuel B the needle indicating knock intensity may be adjusted to hover about the 60 mark on the knock intensity scale. By switching from one fuel to the other and observing the scale and setting the potentiometers, a spread of 20 knock intensity units may be established as representing the difference, in knock intensities corresponding to a difference of one octane number in the qualities of the gasolines being compared. Once calibrated in this way the engine and the detonation meter may be used to compare any two gasolines that have octane qualities very close to those of the reference fuels. Some standard tests specify reference fuels two octane numbers apart and say that only octane qualities between those two may be accurately determined. Once the equipment has been calibrated, the required test runs are made and the equipment is shut down. On subsequent start ups it is recalibrated. When the knock intensities read about where they're expected to, tests are normal. When readings are off scale, out of the expected range or erratic, checks are made to determine the cause of the malfunction. It may be the fuel, the engine, or the electronics. To check the latter signal generators are used.

Because of the adjustments that are built into the detonation meter itself, no attention has been paid to adjusting the signal output of the signal generator. If the signal from the generator didn't cause the knock intensity meter to indicate on the scale, the detonation meter potentiometers were adjusted until it did. However, once the detonation meter potentiometers are changed they cannot be returned to the exact correct setting. Thus it becomes necessary to go back to the beginning and start with the reference fuels again. It is theoretically possible to take prior art signal generators such as described in U.S. Pat. No. 2,629,053; No. 2,830,191; No. 2,968,770 or No. 2,997,665 with their fixed voltage and other characteristics and have a particular setting on the detonation meter where the signal adequately checks out the circuit and cases the knock intensity needle to indicate correctly on the scale but it would be fortuitous coincidence and cannot be relied upon.

The signal generator of this invention does not depend upon coincidence nor upon adjustments in the detonation meter itself but can be adjusted to provide the variable signal which will be acceptable to the particular setting of the detonation meter and associated equipment.

Component 100 is a potentiometer that will vary the voltage magnitude of the signal from 0 to 100 percent of the value put out by the bistable multivibrator. Buffering amplifier 102 serves to boost the current in the signal and 104 is another potentiometer which may be used to regulate the final output signal to 50 to 100 percent of the signal called for by the setting of 100. If switch 108 is set at the "Hi" position the signal is 100 percent of the setting of 100. If the switch is in the "Lo" position the signal will be a smaller portion—(down to 50 percent when the slider is in the CW position.) Thus the signal generator of this invention has a wide range of variability built into it. This variability permits the signal generator to be used regardless of where the detonation meter readings are occurring and a considerable savings in the time required to check, calibrate and recalibrate the instruments results.

Aside from the circuit which had to be conceived, designed and built, two concepts of the prior art methods had to be overcome: (1) it was believed that signal generators should put out a wave signal that simulated a signal one from the transducer in the engine—witness the intricacies of generators such as described in U.S. Pat. No. 2,629,053 and No. 2,830,191 to reproduce the complicated wave signal, and (2) once you had the standard signal it was a requirement that the detonation meter had to be checked by adjusting itself to receive that standard signal.

The prior art was overcome in the present invention by analyzing the situation: (1) the transducer in the engine may put out a characteristic signal acceptable by the detonation meter which signal may be desirable to imitate but it doesn't have to be at a fixed level, and (2) the detonation meter can be electronically checked at its present adjustment by feeding to it a standard characteristic signal at the levels required by the present adjustment.

Thus the signal generator of the instant invention can be used to calibrate, recalibrate and check the correctness of operation of the electronic circuit of a detonation meter by adjusting variable resistors 100 and 104 and when required switching means 108 in order to feed into the detonation meter a signal substantially identical in value to that previously delivered by the transducer in the knock testing engine. For further discussion of detonation meters of the type herein discussed with which the subject invention is particularly useful see U.S. Pat. No. 2,337,522; No. 2,448,322; No. 2,448,323; No. 2,496,337 and No. 2,633,738. For further discussion of octane comparators see British Pat. No. 1,082,870.

Since many different embodiments and uses of the subject invention may be made without departing from the spirit or scope thereof, it is to be understood that the invention is not limited by the specific illustrations except to the extent defined in the following claims.

What is claimed is:

1. In combination, voltage supply means for supplying a pulsating direct current signal at an essentially constant voltage; unijunction transistor timing means for converting said pulsating signal to timed trigger pulses; Bistable multivibrator means for converting said pulses to a fixed voltage amplitude square wave signal; first variable resistance means for picking off a square wave whose voltage amplitude is a variable percentage of the voltage amplitude of said fixed voltage square wave; buffering means; second variable resistance means for picking off a square wave whose voltage amplitude is a variable percentage of the voltage amplitude of the square wave picked off by said first variable resistance means; and switching means for switching between the two variable voltage amplitude square waves.